US011828950B2

(12) United States Patent
Chien et al.

(10) Patent No.: US 11,828,950 B2
(45) Date of Patent: Nov. 28, 2023

(54) LIGHT SOURCE MODULE

(71) Applicant: Qisda Corporation, Taoyuan (TW)

(72) Inventors: Chih-Shiung Chien, Taoyuan (TW);
Ming-Kuen Lin, Taoyuan (TW);
Yi-Ling Lo, Taoyuan (TW);
Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 57 days.

(21) Appl. No.: 17/731,200

(22) Filed: Apr. 27, 2022

(65) Prior Publication Data

US 2023/0140583 A1 May 4, 2023

(30) Foreign Application Priority Data

Oct. 29, 2021 (TW) ................................. 110140444

(51) Int. Cl.
*G02B 27/10* (2006.01)
*G03B 21/20* (2006.01)

(52) U.S. Cl.
CPC ............ *G02B 27/10* (2013.01); *G03B 21/204* (2013.01); *G03B 21/2013* (2013.01); *G03B 21/2066* (2013.01)

(58) Field of Classification Search
None
See application file for complete search history.

(56) References Cited

FOREIGN PATENT DOCUMENTS

CN 104698729 A * 6/2015 ......... G02B 27/1006

* cited by examiner

*Primary Examiner* — Bao-Luan Q Le
*Assistant Examiner* — Danell L Owens

(57) ABSTRACT

A light source module includes a first light-splitting element, a second light-splitting element, a first light source, a second light source and a third light source. The first light source is configured to emit first light having a first wavelength to the first light-splitting element in a first optical path direction. The second light source is configured to emit second light having the first wavelength to the second light-splitting element in a second optical path direction opposite to the second optical path direction. The third light source is configured to emit third light having a second wavelength in a third optical path direction substantially perpendicular to the first optical path direction. The first light source includes a first reflective layer, the second light source includes a second reflective layer, wherein the first reflective layer and the second reflective layer are configured to reflect light having the first wavelength.

20 Claims, 7 Drawing Sheets

LIGHT SOURCE MODULE

This application claims the benefit of Taiwan application Serial No. 110140444, filed Oct. 29, 2021, the subject matter of which is incorporated herein by reference.

TECHNICAL FIELD

The disclosure relates in general to a light source module.

BACKGROUND

The application of a light source modules is wide, and many devices such as a projector, an illuminator, a flashlight, etc. needs the light source modules. Generally speaking, the greater the luminous brightness of the light source module is, the wider the application of the light source module is and the better the lighting effect is. Therefore, submitting a new light source module capable of providing higher brightness is one of the goals of the industry in this technical field.

SUMMARY

According to an embodiment, a light source module is provided. The light source module includes a first light-splitting element, a second light-splitting element, a first light source, a second light source and a third light source. The first light source is configured to emit a first light having a first wavelength to the first light-splitting element in a first optical path direction. The second light source is configured to emit a second light having the first wavelength to the second light-splitting element in a second optical path direction opposite to the second optical path direction. The third light source is configured to emit a third light having a second wavelength to travel in a third optical path direction, wherein the third optical path direction is substantially perpendicular to the first optical path direction, and the second wavelength is different from the first wavelength. The first light source includes a first reflective layer, the second light source includes a second reflective layer, and the first reflective layer and the second reflective layer are configured to reflect light having the first wavelength.

The above and other aspects of the disclosure will become better understood with regard to the following detailed description of the preferred but non-limiting embodiment (s). The following description is made with reference to the accompanying drawings.

Figure 1A:
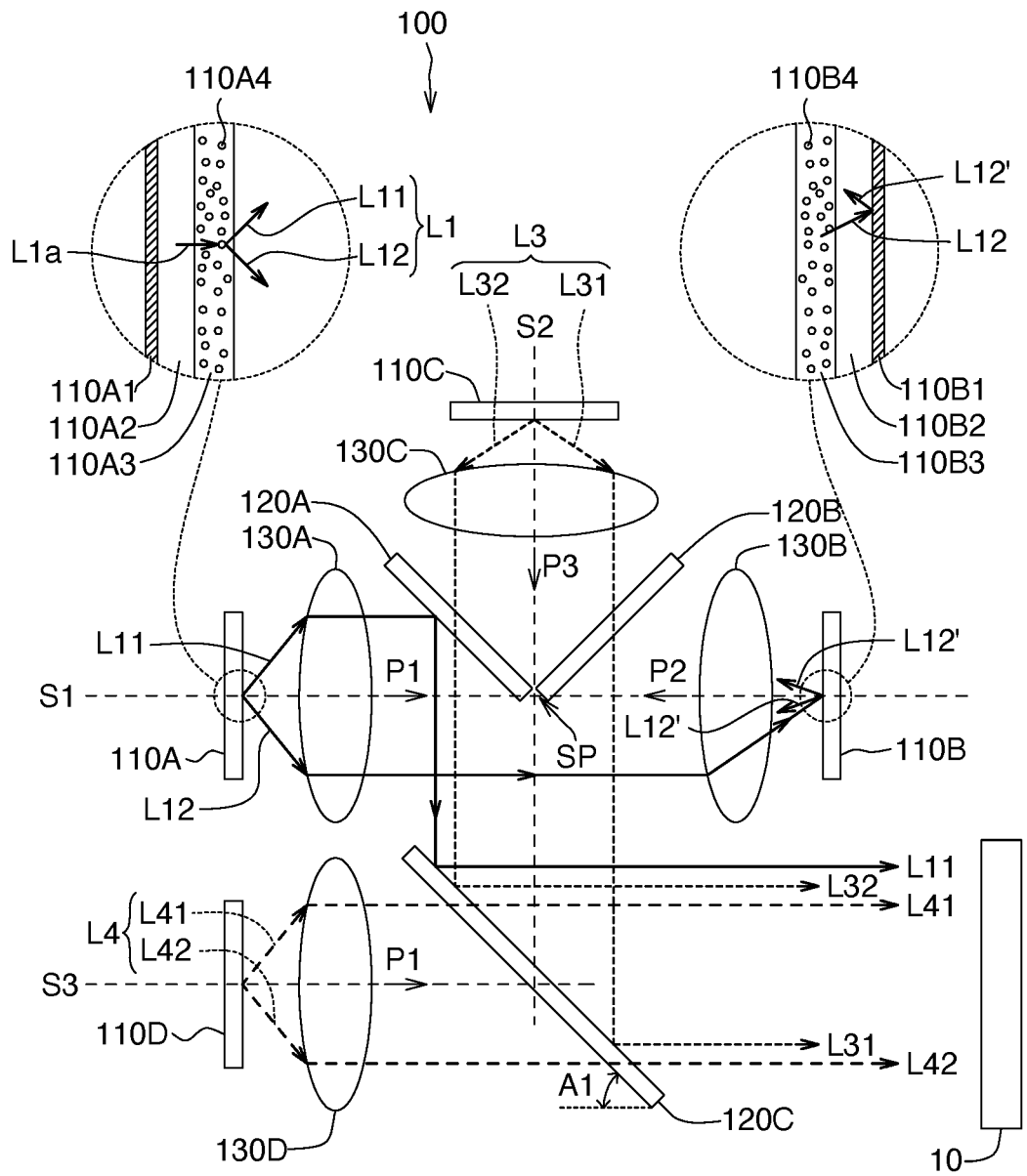
FIGS. 1A and 1B show schematic diagrams of a light source module according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
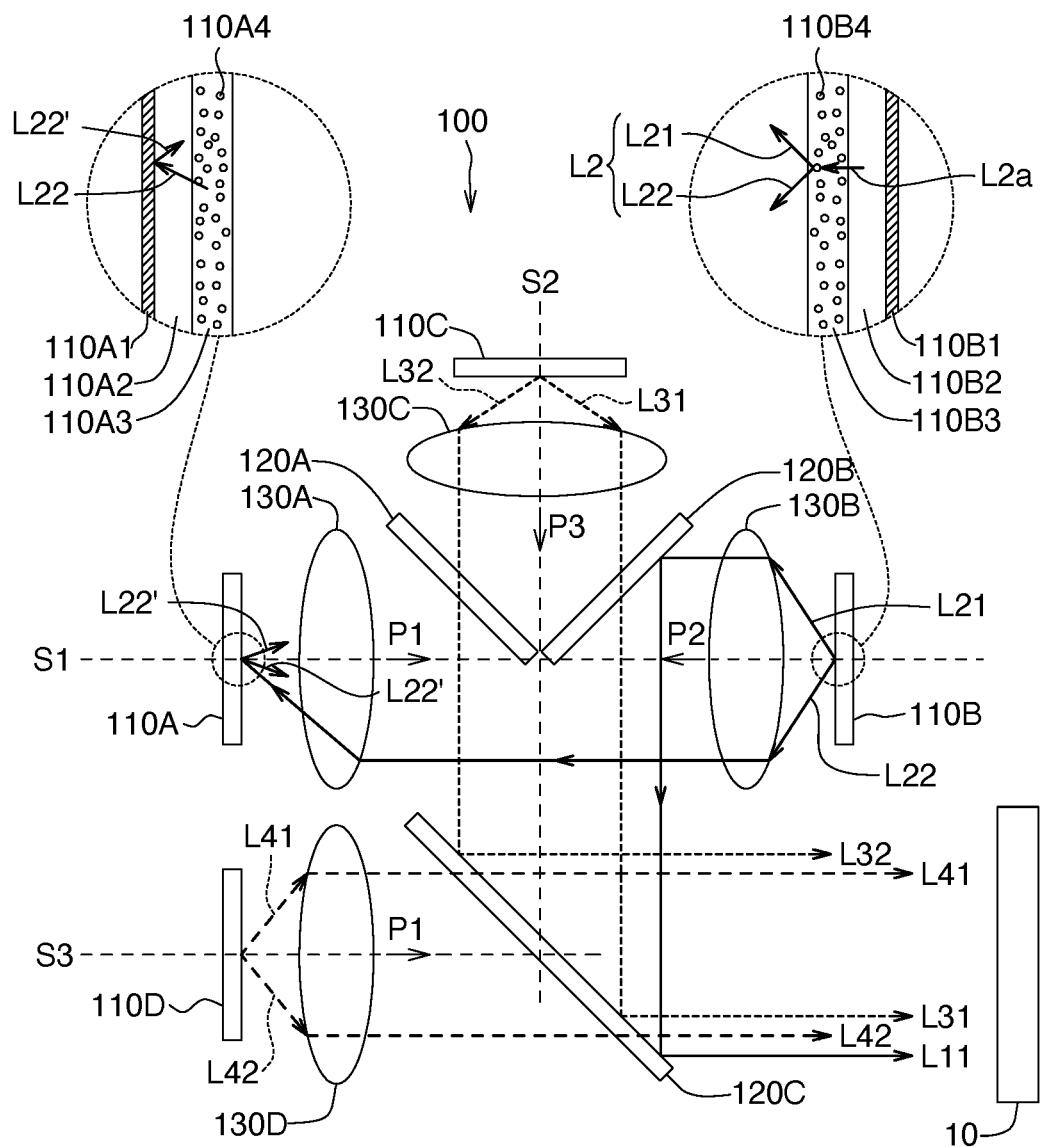

Referring to FIGS. 1A and 1B, FIGS. 1A and 1B show schematic diagrams of a light source module 100 according to an embodiment of the present invention. The light source module 100 could be applied to a device such as a projector, an illuminator, a display or other types of devices that needs a light source. For the projector, the light source module 100 is also referred to as a light combining module.

The light source module 100 includes a first light source 110A, a second light source 110B, a third light source 110C, a fourth light source 110D, a first light-splitting element 120A, a second light-splitting element 120B, a third light-splitting element 120C, and at least one condensing lens, for example, a first condensing lens 130A, a second condensing lens 130B and a third condensing lens 130C.

As shown in FIG. 1A, the first light source 110A is configured to emit a first light L1 (including light L11 and light L12) having a first wavelength to the first light-splitting element 120A in a first optical path direction P1. As shown in FIG. 1B, the second light source 110B is configured to emit a second light L2 (including light L21 and light L22) having the first wavelength to the second light-splitting element 120B in the second optical path direction P2 opposite to the first optical path direction P1. The third light source 110C is configured to emit a third light L3 having a second wavelength to travel in a third optical path direction P3 substantially perpendicular to the first optical path direction P1. The second wavelength is different from the first wavelength. The first light source 110A includes a first reflective layer 110A1, and the second light source 110B includes a second reflective layer 110B1. The first reflective layer 110A1 and the second reflective layer 110B1 are configured to reflect light, for example, the first reflective layer 110A1 reflects a portion of the second light L2 (e.g., the fourth part L22 which will be described later), and the second reflective layer 110B1 reflects a portion of the first light L1 (e.g., the second part L12 which will be described later. As a result, an optical path length of the first light L1 could be shortened due to the arrangement of the first light-splitting element 120A, and an optical path length of the second light L2 could be shortened due to the arrangement of the second light-splitting element 120B. In addition, due to the first light source 110A and the second light source 110B having the same wavelength and oppositely disposed, it could increase the brightness of the light source module 100.

In the present embodiment, the first wavelength ranges, for example, between 495 nanometers (nm) and 570 nm, and the second wavelength ranges, for example, between 450 nm and 475 nm, or between 620 nm and 750 nm. Furthermore, the first light L1 and the second light L2 are, for example, green light, and the third light L3 is, for example, blue light or red light. Green light accounts for about 70% of white light. The higher the proportion of green light is, the higher the brightness of white light is. Since the light emitted by the light source module 100 includes mixed light of two beams of the green light (the first light L1 and the second light L2), the brightness of the white light emitted by the light source module 100 could be enhanced.

As shown in FIGS. 1A and 1B, the first light source 110A and the second light source 110B are disposed opposite to each other. The first light source 110A and the second light source 110B are disposed in a first center line S1. For example, the first center line S1 passes through a center of the first light source 110A and a center of the second light source 110B. The first light source 110A and the second light source 110B are divided into two halves by the first center line S1. As a result, the first light L1 emitted by the first light source 110A is divided into a first part L11 and a second part L12 relative to the first center line S1. The first part L11 is incident to the first light-splitting element 120A in the first optical path direction P1 above the first center line S1, and is reflected to a module 10 through the first light-splitting element 120A and the third light-splitting element 120C in order, wherein the module 10 is, for example, an illuminating module or an imaging module. The second part L12 is incident to the second light source 110B in the first optical path direction P1, and is reflected by the second reflective layer 110B1 of the second light source 110B (the reflected light is hereinafter referred to as the second reflected part L12'). The optical path of the second reflected part L12' is similar to or the same as the optical path of the second light L2 of the second light source 110B (as shown in FIG. 1B). The optical path of the second light L2 will be described later.

As shown in FIG. 1B, the second light L2 emitted by the second light source 110B is divided into a third part L21 and a fourth part L22 relative to the first center line S1. The third part L21 is incident to the second light-splitting element 120B in the second optical path direction P2 above the first center line S1, and is reflected to the module 10 through the second light-splitting element 120B and the third light-splitting element 120C in order. The fourth part L22 is incident to the first light source 110A in the second optical path direction P2, and is reflected by the first reflective layer 110A1 of the first light source 110A (the reflected light is hereinafter referred to as the fourth reflected part L22'). The optical path of the fourth reflected part L22' is similar to or the same as the optical path (as shown in FIG. 1A) of the first light L1 of the first light source 110A, and the similarities will not be repeated here.

Similar to the optical path of the second light L2, a portion of the second reflected part L12' (FIG. 1A) is incident to the first light source 110A, and another portion travels to the module 10. Similar to the optical path of the first light L1, a portion of the fourth reflected part L22' (FIG. 1B) is incident to the second light source 110B, and another part travels to the module 10. According to such structure, the light utilization rate could be increased. After the first light L1 and the second light L2 are reflected several times, light is finally emitted from the light source module 100.

Although the optical path of the first light L1 and the optical path of the second light L2 are shown in FIGS. 1A and 1B respectively, the optical path of the first light L1 shown in FIG. 1A and the optical path of the second light L1 shown in FIG. 1B could be occur simultaneously.

As shown in FIG. 1A, the first light source 110A further includes a first light-emitting layer 110A2 and a first wavelength conversion layer 110A3. The first light-emitting layer 110A2 is formed between the first wavelength conversion layer 110A3 and the first reflective layer 110A1, and the first wavelength conversion layer 110A3 is closer to the second light source 110B than the first reflective layer 110A1. The first light-emitting layer 110A2 includes, for example, at least one semiconductor epitaxial layer which could emit light L1a, and the first wavelength conversion layer 110A3 could convert the light L1a into the first light L1 having the first wavelength. In the present embodiment, the light L1a is, for example, light having the second wavelength, such as blue light or red light. The first wavelength conversion layer 110A3 includes a plurality of fluorescent particles 110A4 which could excite light for converting the wavelength of the light. For example, the first wavelength conversion layer 110A3 converts the light L1a (e.g., blue light) into the first light L1 (e.g., green light) of the first wavelength. In another embodiment, the light L1a emitted by the first light-emitting layer 110A2 could be the first light L1 having the first wavelength, and, in this example, the first light source 110A could omit the first wavelength conversion layer 110A3.

As shown in FIG. 1B, the second light source 110B further includes a second light-emitting layer 110B2 and a second wavelength conversion layer 110B3. The second light emitting layer 110B2 is formed between the second wavelength conversion layer 110B3 and the second reflective layer 110B1, and the second wavelength conversion layer 110B3 is closer to the first light source 110A than the second reflective layer 110B1. The second light-emitting layer 110B2 includes, for example, at least one semiconductor epitaxial layer which could emit light L2a. The second wavelength conversion layer 110B3 could convert the light L2a into the second light L2 having the first wavelength. In the present embodiment, the light L2a is, for example, light having the second wavelength, such as blue light or red light. The second wavelength conversion layer 110B3 includes a plurality of fluorescent particles 110B4 which could excite light for converting the light wavelength. For example, the second wavelength conversion layer 110B3 converts the light L2a (e.g., blue light) into the second light L2 (e.g., green light) having the first wavelength. In another embodiment, the light L2a emitted by the second light-emitting layer 110B2 could be the second light L2 having the first wavelength, and, in this example, the second light source 110B could omit the second wavelength conversion layer 110B3.

As shown in FIG. 1A, the third light source 110C is disposed on a side of the first center line S1. In addition, the third light source 110C is disposed in the second center line S2, so that the third light L3 emitted by the third light source 110C is divided into two parts L31 and L32 relative to the second center line S2. In addition, the second center line S2 passes through a center of the third light source 110C. As a result, the two parts L31 and L32 of the third light L3 have substantially the same amount of light relative to the second center line S2.

As shown in FIG. 1A, the fourth light source 110D is configured to emit fourth light L4 having a third wavelength to the third light-splitting element 120C in the first optical path direction P1. The third wavelength is different from the first wavelength and the second wavelength. In an embodiment, the second wavelength ranges, for example, between 450 nm and 475 nm, and the third wavelength ranges, for example, between 620 nm and 750 nm. Furthermore, the third light L3 is, for example, blue light, and the fourth light L4 is, for example, red light.

As shown in FIG. 1A, the fourth light source 110D is disposed in a center line S3. As a result, the fourth light L4 emitted by the fourth light source 110D is divided into a fifth part L41 and a sixth part L42 relative to the center line S3.

In addition, the center line S3 passes through a center of the fourth light source 110D, so that the fifth part L41 and the sixth part L42 of the fourth light L4 have substantially the same amount of light relative to the center line S3.

As shown in FIG. 1A, the first light-splitting element 120A is disposed opposite to the first light source 110A. The first light-splitting element 120A is located at a side of the first center line S1, such as the side close to the third light source 110C, so that the first part L11 of the first light L1 is incident to the first light-splitting element 120A, but the second part L12 is not incident to the light-splitting element 120A. As a result, the second part L12 of the first light L1 could be incident to the second light source 110B to be reflected by the second light source 110B.

As shown in FIG. 1B, the second light-splitting element 120B is located at a side of the first centerline S1, such as the side close to the third light source 110C, so that the third part L21 of the second light L2 is incident to the second light-splitting element 120B, but the fourth part L22 is not incident to the second light-splitting element 120B. As a result, the fourth part L22 of the second light L2 could be incident to the first light source 110A to be reflected by the first light source 110A.

As shown in FIG. 1A, there is an interval SP between the first light-splitting element 120A and the second light-splitting element 120B, that is, the first light-splitting element 120A and the second light-splitting element 120B are separately disposed. The second center line S2 passes through the interval SP, for example. As a result, at least one portion of the third light L3 travels through the interval SP in the third optical path direction P3, that is, at least such portion does not travel through the physical materials of the first light-splitting element 120A and the second light-splitting element 120B. In addition, the first light-splitting element 120A and the second light-splitting element 120B are disposed opposite to the third light source 110C. For example, the first light-splitting element 120A and the second light-splitting element 120B are respectively disposed on opposite two sides of the second center line S2. As a result, the fifth part L31 and the sixth part L32 of the third light L3 could pass through the second light-splitting element 120B and the first light-splitting element 120A respectively. In another embodiment, the first light-splitting element 120A and the second light-splitting element 120B could be connected to each other, for example, the first light-splitting element 120A and the second light-splitting element 120B are integrated into one piece. As a result, the entire third light L3 travels through, in the third optical path direction P3, the physical materials of the first light-splitting element 120A and the second light-splitting element 120B.

As shown in FIG. 1A, the first light-splitting element 120A and the second light-splitting element 120B are disposed opposite to the third light source 110C. For example, the first light-splitting element 120A and the second light-splitting element 120B are disposed on opposite two sides of the second centerline S2 respectively, so that the two parts L31 and L32 of the third light L3 could be incident to the first light-splitting element 120A and the light-splitting element 120B respectively.

As shown in FIG. 1A, the third light-splitting element 120C is disposed opposite to the third light source 110C. The second center line S2 passes through the third light source 110C and the third light-splitting element 120C, for example, passes through the center of the third light source 110C and the third light-splitting element 120C. As a result, the entire third light L3 emitted by the third light source 110C could be incident to the third light-splitting element 120C. In addition, the third light-splitting element 120C is disposed opposite to the fourth light source 110D. The center line S3 passes through the fourth light source 110D and the third light-splitting element 120C, for example, travels through the center of the fourth light source 110D and the center of the third light-splitting element 120C. As a result, the entire fourth light L4 emitted by the fourth light source 110D could be incident to the third light-splitting element 120C.

In terms of the arrangement position of the light-splitting element, as shown in FIG. 1A, an angle A1 of the third light-splitting element 120C with respect to a horizontal reference line is 45 degrees, for example, so that the light reflected by the third light-splitting element 120C travels in the first optical path direction P1. In another embodiment, the angle A1 of the third light-splitting element 120C with respect to the horizontal reference line could be 135 degrees or −45 degrees, and the fourth light source 110D could be disposed on another side of the third light-splitting element 120C of FIG. 1A. As a result, the light reflected by the third light-splitting element 120C could travel in the second optical path direction P2. In addition, the angle A1 of the first light-splitting element 120A with respect to the horizontal reference line is, for example, 45 degrees, and the angle A1 of the second light-splitting element 120B with respect to the horizontal reference line is, for example, 135 degrees or −45 degrees.

In terms of light-splitting characteristics, the light-splitting element is, for example, a dichroic mirror. As shown in FIGS. 1A and 1B, the first light-splitting element 120A could reflect the first light L1 having the first wavelength (for example, the green light spectrum) but allows the third light L3 having the second wavelength (for example, blue light spectrum) to travel through. The second light-splitting element 120B could reflect the second light L2 having the first wavelength (for example, the green light spectrum) but allows the third light L3 of the second wavelength (for example, the blue light spectrum) to travel through. The third light-splitting element 120C could reflect the first light L1 and the second light L2 having the first wavelength (for example, the green light spectrum) and reflect the third light L3 having the second wavelength (for example, the blue light spectrum), but allow the fourth light L4 having three wavelengths (for example, the red light spectrum) to travel through.

The condensing lens could condense the light emitted by the light source, so that the light traveling through the condensing lens becomes collimated light. The condensing lens includes at least one lens, for example, a spherical lens, an aspheric lens or a combination thereof.

As shown in FIG. 1A, the first condensing lens 130A is disposed opposite to the first light source 110A. The first condensing lens 130A is disposed in the first center line S1. For example, the first center line S1 passes through a center of the first condensing lens 130A, so that the first part L11 and the second part L12 incident to the first condensing lens 130A have substantially the same amount of light relative to the first center line S1.

As shown in FIG. 1A, the second condensing lens 130B is disposed opposite to the second phase light source 110B. The second condensing lens 130B is disposed in the first center line S1. For example, the first center line S1 passes through the center of the second condensing lens 130B so that the third part L21 and the fourth part L22 incident to the second condensing lens 130B have substantially the same amount of light relative to the first center line S1.

As shown in FIG. 1A, the third condensing lens 130C is disposed opposite to the third light source 110C. The third condensing lens 130C is disposed in the second center line S2. For example, the second center line S2 passes through a center of the third condensing lens 130C, so that the fifth part L31 and the sixth part L32 incident to the third condensing lens 130C have substantially the same amount of light relative to the second center line S2.

As shown in FIG. 1A, the fourth condensing lens 130D is disposed opposite to the fourth light source 110D. The fourth condensing lens 130D is disposed in the center line S3. For example, the center line S3 passes through a center of the fourth condensing lens 130D, so that the fifth part L41 and the sixth part L42 incident to the fourth condensing lens 130D have substantially the same amount of light relative to the center line S3.

Figure 2:
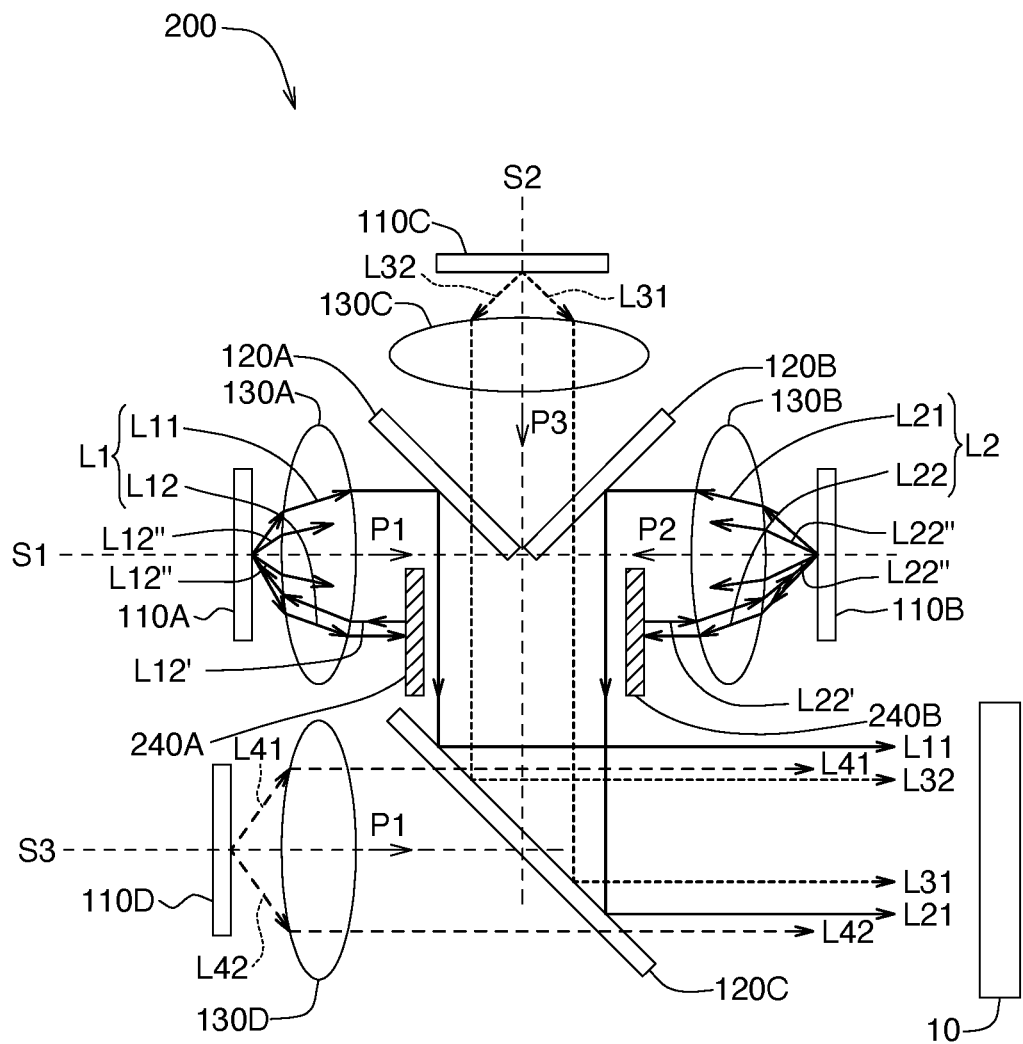
FIG. 2 shows a schematic diagram of the optical path of a light source module according to another embodiment of the present invention.

Referring to FIG. 2, FIG. 2 shows a schematic diagram of the optical path of a light source module 200 according to another embodiment of the present invention. The light source module 200 includes the first light source 110A, the second light source 110B, the third light source 110C, the fourth light source 110D, the first light-splitting element 120A, the second light-splitting element 120B, the third light-splitting element 120C and at least one condensing lens (for example, the first A condensing lens 130A, the second condensing lens 130B, the third condensing lens 130C), a first reflective element 240A and a second reflective element 240B. The light source module 200 of the embodiment of the present invention has the features similar to or the same as that of the light source module 100 expect that the light source module 200 further includes at least one reflective element, such as at least one reflective mirror.

As shown in FIG. 2, the first reflective element 240A is disposed opposite to the first light source 110A. The first part L11 of the first light L1 is incident to the first light-splitting element 120A in the first optical path direction P1 and reflected to the module 10 through the first light-splitting element 120A and the third light-splitting element 120C. The second part L12 of the first light L1 is incident to the first reflective element 240A in the first optical path direction P1 and reflected back the first light source 110A from the first reflective element 240A (the reflected light is hereinafter referred to as the second reflected part L12'). The second reflected part L12' reflected from the first light source 110A becomes a second reflected part L12". The optical path of such second reflected part L12" is similar to or the same as the optical path of the first light L1, and the similarities will not be repeated here.

In addition, due to the arrangement of the first reflective element 240A, the light (spot) reflected back the first light source 110A from the first reflective element 240A will not be misaligned with the first light source 110A, and accordingly it could obtain a better matching effect of object-side image. In addition, since the light (spot) reflected back the first light source 110A from the first reflective element 240A will not be misaligned with the first light source 110A, the light (spot) reflected back the first light source 110A from the first reflective element 240A could be completely reflected by the first reflective layer 110A1 of the first light source 110A, and thus the problem of light leakage would not occur.

As shown in FIG. 2, the second reflective element 240B is disposed opposite to the second light source 110B. The third part L21 of the second light L2 is incident to the second light-splitting element 120B in the second optical path direction P2 and reflected to the module 10 through the second light-splitting element 120B and the third light-splitting element 120C. The fourth part L22 of the second light L2 is incident to the second reflective element 240B in the second optical path direction P2 and reflected back the second light source 110B from the second reflective element 240B (the reflected light is hereinafter referred to as the fourth reflected part L22'). The fourth reflected part L22' reflected by the second light source 110B becomes a fourth reflected part L22". The optical path of the fourth reflected part L22" is similar to or the same as the optical path of the second light L2, and the similarities will not be repeated here.

In addition, due to the arrangement of the second reflective element 240B, the light (spot) reflected back the second light source 110B from the second reflective element 240B will not be misaligned with the second light source 110B, and accordingly it could obtain a better matching effect of object-side image. In addition, since the light (spot) reflected back the second light source 110B from the second reflective element 240B will not be misaligned with the second light source 110B, the light (spot) reflected back the second light source 110B from the second reflective element 240B could be completely reflected by the second reflective layer 110B, and thus the problem of light leakage would not occur.

As shown in FIG. 2, the first light source 110A and the second light source 110B are disposed in the first center line S1. The first light-splitting element 120A and the first reflective element 240A are disposed on opposite two sides of the first center line S1 respectively. As a result, the first part L11 and the second part L12 of the first light L1 are incident to the first light-splitting element 120A and the first reflective element 240A respectively. Similarly, the second light-splitting element 120B and the second reflective element 240B are respectively disposed on opposite two sides of the first center line S1. As a result, the third part L21 and the fourth part L22 of the second light L2 are incident to the second light-splitting element 120B and the second reflective element 240B, respectively.

As shown in FIG. 2, the first reflective element 240A is located outside the optical path of the first part L11 of the first light L1 (that is, the first reflective element 240A is not located at the optical path of the first part L11), and thus it could prevent from being blocking the traveling of the first part L11 or reduce the amount of the blocked first part L11. The second reflective element 240B is located outside the optical path of the third part L21 of the second light L2 (that is, the second reflective element 240B is not located at the optical path of the third part L21), and thus it could prevent from being blocking the traveling of the third part L21 of the second light L2 or reduce the amount of the blocked first part L11.

Figure 3:
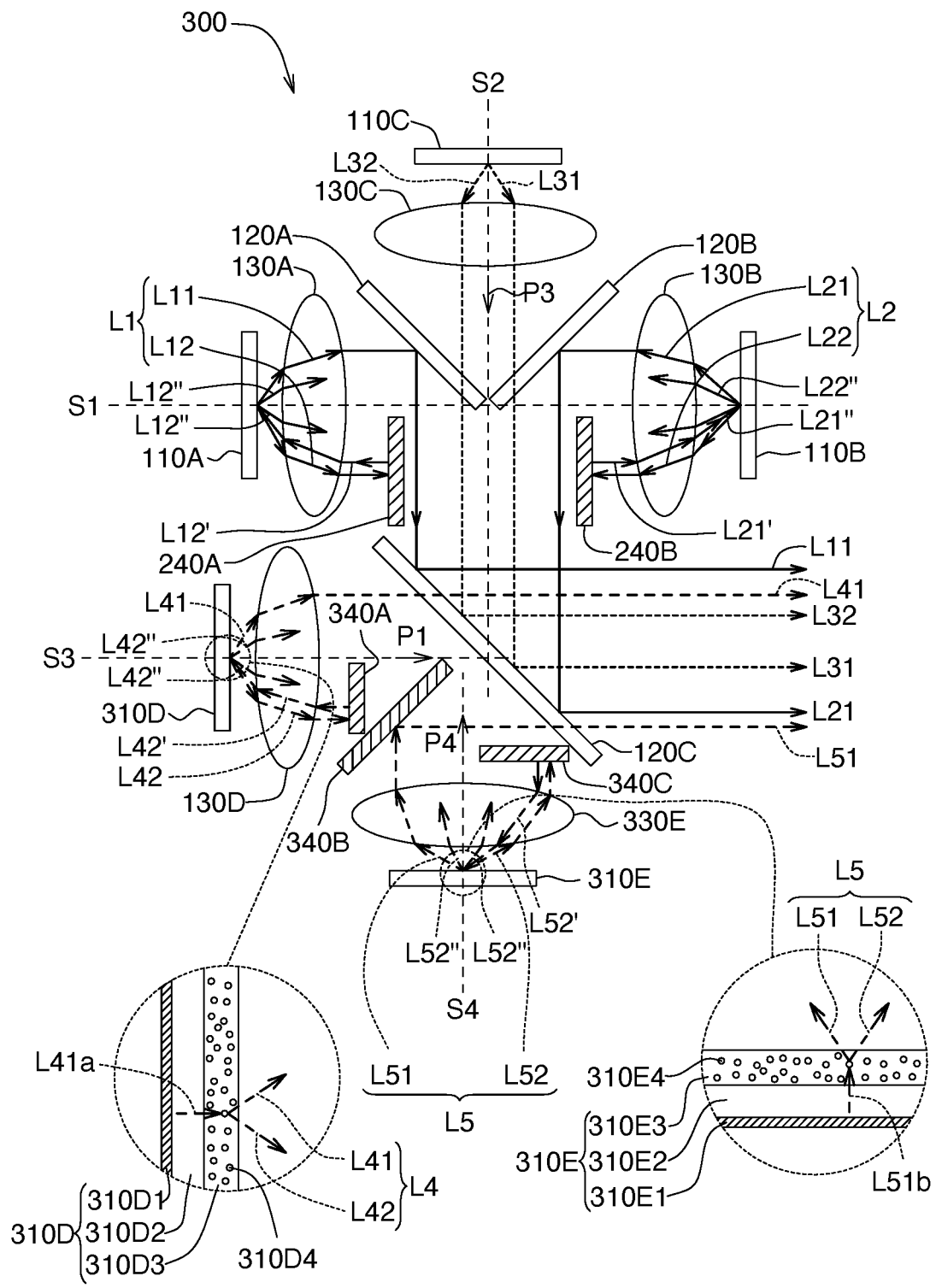
FIG. 3 shows a schematic diagram of the optical path of a light source module according to another embodiment of the present invention.

Referring to FIG. 3, FIG. 3 shows a schematic diagram of the optical path of a light source module 300 according to another embodiment of the present invention. The light source module 300 includes the first light source 110A, the second light source 110B, the third light source 110C, a fourth light source 310D, a fifth light source 310E, the first light-splitting element 120A, the second light-splitting element 120B, the third light-splitting element 120C, at least one condensing lens (for example, the first condensing lens 130A, the second condensing lens 130B, the third condensing lens 130C, the fourth condensing lens 130D, a fifth condensing lens 330E), the first reflective element 240A, the second reflective element 240B, a third reflective element 340A, a fourth The reflective element 340B and a fifth reflective element 340C.

The third light source 110C is configured to emit the third light L3 having the second wavelength, the fourth light source 310D is configured to emit the fourth light L4 having the third wavelength, and the fifth light source 310E is configured to emit the fifth light L5 having the third wavelength. In the present embodiment, the third light L3 is, for example, blue light, and the fourth light L4 and the fifth light L5 are, for example, red light.

The fifth light source 310E is disposed in a fourth center line S4, for example, the fourth center line S4 passes through a center of the fifth light source 310E. The fifth light L5 is divided into a seventh part L51 and an eighth part L52 relative to the fourth center line S4. The fourth reflective element 340B and the fifth reflective element 340C are disposed on opposite two sides of the fourth center line S4 respectively. As a result, the seventh part L51 and the eighth part L52 of the fifth light L5 could be incident to the fourth reflective element 340B and the fifth reflective element 340C respectively.

Furthermore, the seventh part L51 of the fifth light L5 travels to the fourth reflective element 340B in the fourth optical path direction P4, and is incident to the module 10 through the fourth reflective element 340B and the third light-splitting element 120C in order. The eighth part L52 of the fifth light L5 is reflected back the fifth light source 310E from the fifth reflective element 340C (the reflected light is hereinafter referred to as an eighth reflected part L52'). The fifth light source 310E includes a reflective layer 310E1. The eighth reflected part L52' reflected by the reflective layer 310E1 becomes an eighth reflected part L52". The optical path of the eighth reflected part L52" is similar to or the same as the optical path of the fifth light L5, and the similarities will not be repeated here. In addition, the fourth optical path direction P4 is opposite to the third optical path direction P3.

In an embodiment, the fifth light source 310E further includes a light-emitting layer 310E2 and a wavelength conversion layer 310E3. The light-emitting layer 310E2 is formed between the wavelength conversion layer 310E3 and the reflective layer 310E1, and the wavelength conversion layer 310E3 is closer to the fifth condensing lens 330E than the reflective layer 310E1. The light-emitting layer 310E2 includes, for example, at least one semiconductor epitaxial layer which could emit light L51b. The wavelength conversion layer 310E3 converts the light L51b into a fifth light L5 having the second wavelength. The wavelength conversion layer 310E3 includes a plurality of fluorescent particle 310E4 which could excite an incident light for converting the incident light into a converted light having different wavelength. For example, the wavelength conversion layer 310E3 converts the light L51b (e.g., blue light) into the fifth light L5 (e.g., red light) having the second wavelength. In another embodiment, the light emitting layer 310E2 could directly emit red light, and, in such example, the fifth light source 310E could omit the wavelength conversion layer 310E3.

The third reflective element 340A is disposed opposite to the fourth light source 310D. For example, the third reflective element 340A is disposed on a side of the center line S3, for example, the side close to the fifth light source 310E. The fourth light L4 includes the fifth part L41 and the sixth part L42. The fifth part L41 is incident to the third light-splitting element 120C in the first optical path direction P1 and incident to the module 10 travels through the third light-splitting element 120C. The sixth part L42 is incident to the third reflective element 340A in the first optical path direction P1 and reflected back to the fourth light source 310D from the third reflective element 340A (the reflected light is hereinafter referred to as a sixth reflected part L42'). The fourth light source 310D includes a reflective layer 310D1.

The sixth reflected part L42' reflected by the reflective layer 310D1 of the fourth light source 310D becomes a sixth reflected part L42". The optical path of the sixth reflected part L42" is similar to or the same as the optical path of the fourth light L4, and the similarities will not be repeated here.

In an embodiment, the fourth light source 310D further includes a light-emitting layer 310D2 and a wavelength conversion layer 310D3. The light emitting layer 310D2 is formed between the wavelength conversion layer 310D3 and the reflective layer 310D1, and the wavelength conversion layer 310D3 is closer to the fourth condensing lens 130D than the reflective layer 310D1. The light emitting layer 310D2 includes, for example, at least one semiconductor epitaxial layer which could emit light L41a. The wavelength conversion layer 310D3 converts the light L41a into the fourth light L4 having the second wavelength. The wavelength conversion layer 310D3 includes a plurality of fluorescent particles 310D4 which could excite an incident light for converting the incident light into a converted light having different wavelength. For example, the wavelength conversion layer 310D3 converts the light L41a (e.g., blue light) into the fourth light L4 (e.g., red light) having the second wavelength. In another embodiment, the light emitting layer 310D2 could directly emit red light, and, in such example, the fourth light source 310D could omit the wavelength conversion layer 310D3.

The fourth light source 110D of the aforementioned embodiment has the features same as or similar to that of the fourth light source 310D except that the fourth light source 110D could selectively omit the reflective layer.

In addition, the fifth condensing lens 330E is disposed opposite to the fifth light source 310E. The fifth condensing lens 330E is disposed on the fourth centerline S4. For example, the fourth centerline S4 passes through a center of the fifth condensing lens 330E, so that the seventh part L51 and the eighth part L52 incident to of the fifth condensing lens 330E have substantially the same amount of light relative to the fourth center line S4.

Figure 4:
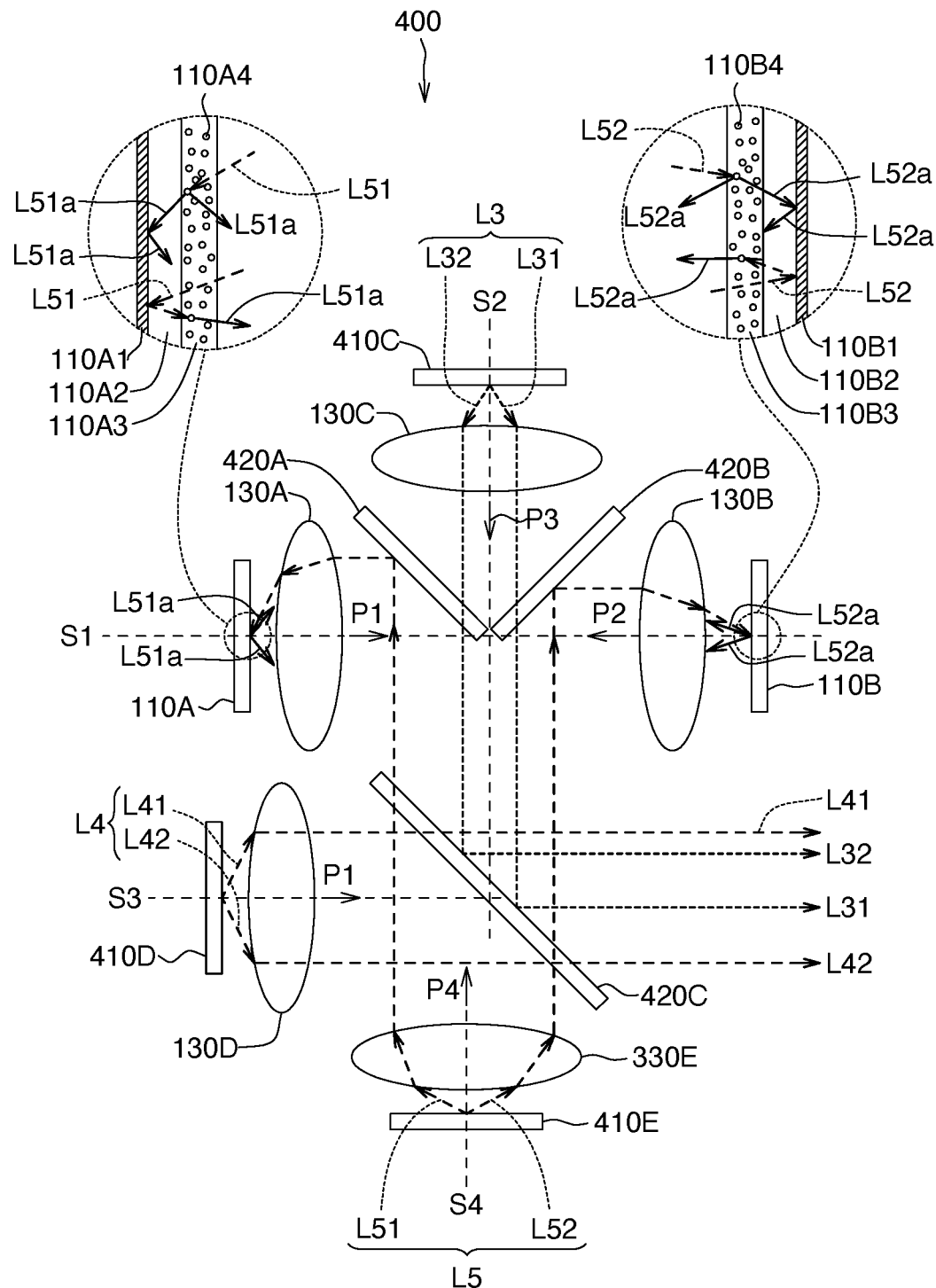
FIG. 4 shows a schematic diagram of the optical path of a light source module according to another embodiment of the present invention.

Referring to FIG. 4, FIG. 4 shows a schematic diagram of the optical path of a light source module 400 according to another embodiment of the present invention. Although not shown, the optical path of the light source module 400 could further include the optical path of the first light L1 emitted by the first light source 110A and/or the optical path of the second light L2 emitted by the second light source 110B.

The light source module 400 includes the first light source 110A, the second light source 110B, the third light source 410C, a fourth light source 410D, a fifth light source 410E, a first light-splitting element 420A, a second light-splitting element 420B, and a third light-splitting element 420C and at least one condensing lens, for example, the first condensing lens 130A, the second condensing lens 130B, the third condensing lens 130C, the fourth condensing lens 130D and the fifth condensing lens 330E.

The third light source 410C is configured to emit the third light L3 having the second wavelength to be incident to the first light-splitting element 420A and the second light-splitting element 420B in the third optical path direction P3. The fourth light source 410D is configured to emit the fourth light L4 having the third wavelength to be incident to the third light-splitting element 420C in the first optical path direction P1. The fifth light source 410E is configured to emit the fifth light L5 having the third wavelength to be incident to the third light-splitting element 420C in the fourth optical path direction P4. The first wavelength conversion layer 110A3 and the second wavelength conversion layer 110B3 are configured to convert the fifth light L5 having the third wavelength into the light having the first wavelength. In the present embodiment, the third light L3 is, for example, red light, and the fourth light L4 and the fifth light L5 are, for example, blue light.

The relative relationship among the third light source 410C, the first light-splitting element 420A and the second light-splitting element 420B is similar to the relative relationship among the third light source 110C, the first light-splitting element 420A and the second light-splitting element 420B, and the similarities will not be repeated here. The relative relationship between the fourth light source 410D and the third light-splitting element 420C is similar to the relative relationship between the fourth light source 110D and the third light-splitting element 120C, and the similarities will not be repeated here.

The fifth light source 410E is disposed in the fourth center line S4, for example, the fourth center line S4 passes through a center of the fifth light source 410E. The fifth light L5 is divided into the seventh part L51 and the eighth part L52 relative to the fourth center line S4. The seventh part L51 travels to the first light source 110 through the fourth condensing lens 330E, the third light-splitting element 420C, the first light-splitting element 420A and the first condensing lens 130A. After the seventh part L51 is converted into a converted light L51a having the first wavelength by the first wavelength conversion layer 110A3 of the first light source 110A, a portion of the converted light L51a is reflected to the first condensing lens 130A through the first reflective layer 110A1, and another portion of the converted light L51a could be directly reflected (not through the first reflective layer 110A1) to the first condensing lens 130A by the fluorescent particles 110A4. In addition, the seventh part L51 that has not been converted by the fluorescent particles 110A4 could be reflected back the first wavelength conversion layer 110A3 by the first reflective layer 110A1 for increasing the probability of converting the light wavelength by the fluorescent particles 110A4. The optical path of the converted light L51a provided by the first light source 110A is similar to or the same as the optical path of the first light L1 (shown in FIG. 1A) emitted by the first light source 110A, and the similarities will not be repeated here. Similarly, after the eighth part L52 is converted, by the second wavelength conversion layer 110B3 of the second light source 110B, into the converted light L52a having the first wavelength, a portion of the converted light L52a is reflected to the second condensing lens 130B through the second reflective layer 110B1, and another portion of the converted light L52a could be directly reflected (not through the second reflective layer 110B1) to the second condensing lens 130B by the fluorescent particles 110B4. In addition, the eighth part L52 that has not been converted by the fluorescent particles 110B4 could be reflected back the second wavelength conversion layer 110B3 by the second reflective layer 110B1 for increasing the probability of converting the light wavelength by the fluorescent particles 110B4. The optical path of the converted light L52a provided by the second light source 110B is similar to or the same as the optical path of the second light L2 (shown in FIG. 1B) emitted by the second light source 110B, and the similarities will not be repeated here.

In summary, although the wavelength of the fifth light L5 emitted by the fifth light source 410E is different from the first wavelength, the fifth light L5 could be converted into the converted light L51a and the converted light L52a having the first wavelength through the first wavelength conversion layer 110A3 and the second wavelength conversion layer 110B3 for increasing the amount of light which has the first wavelength and is traveled to the module from the light source module 400.

In another embodiment, the first light source 110A of FIG. 4 could not emit the first light L1 and/or the second light source 110B could not emit the second light L2. Furthermore, the first light source 110A could provide the converted light L51a having the first wavelength (as if the first light source 110A emits the converted light L51a) through the first wavelength conversion layer 110A3 and the first reflective layer 110A1, and/or the second light source 110B could provide the converted light L52a having the first wavelength (as if the second light source 110B emits the converted light L52a) through the second wavelength conversion layer 110B3 and the second reflective layer 110B1. In such example, the first light source 110A could omit the first light-emitting layer 110A2 and/or the second light source 11B could omit the second light-emitting layer 110B2, that is, the first light source 110A includes the first wavelength conversion 110A3 disposed on the first reflective layer 110A1, and the second light source 110B includes the second wavelength conversion layer 110B3 disposed on the second reflective layer 110B1.

In terms of light-splitting characteristics, as shown in FIG. 4, the first light-splitting element 420A could reflect the first light L1 and the second light L2 (not shown in the FIG. 4) having the first wavelength (for example, green light spectrum) and the fifth light L5 having the third wavelength (for example, blue light spectrum) but allows the third light L3 having the second wavelength (for example, red light spectrum) to travel through. The second light-splitting element 420B could reflect the second light L2 and the first light L1 (not shown in FIG. 4) having the first wavelength (for example, green light spectrum) and the fifth light L5 having the third wavelength (for example, blue light spectrum) but allows the third light L3 having the second wavelength (for example, red light spectrum) to travel through. The third light-splitting element 420C could reflect the first light L1 (not shown in FIG. 4) and the second light L2 (not shown in FIG. 4) having the first wavelength (for example, green light spectrum) and the third light L3 having the second wavelength (for example, red light spectrum), but allows the fourth light L4 and the fifth light L5 having the third wavelength (for example, blue light spectrum) to travel through.

Figure 5:
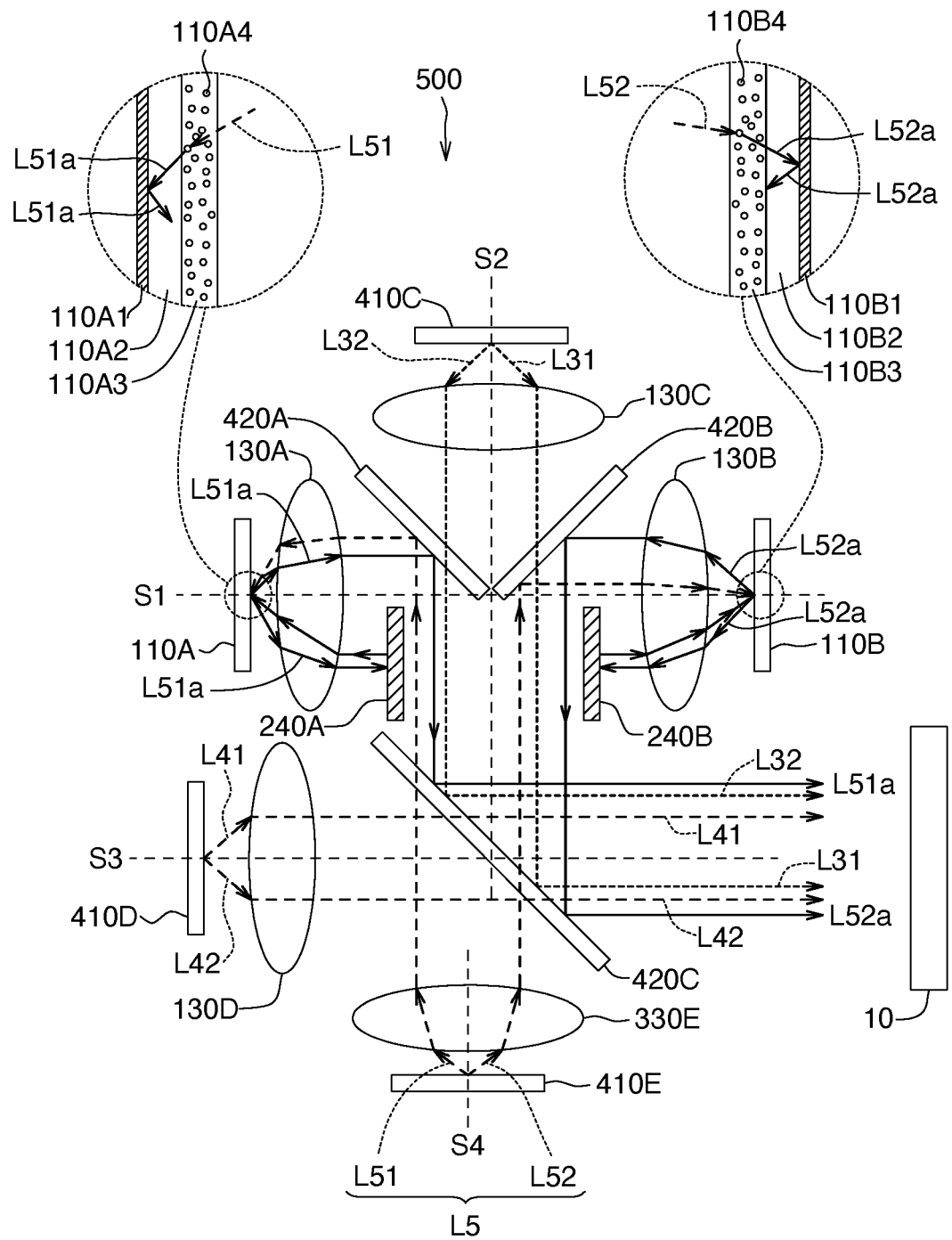
FIG. 5 shows a schematic diagram of the optical path of a light source module according to another embodiment of the present invention.

Referring to FIG. 5, FIG. 5 shows a schematic diagram of the optical path of a light source module 500 according to another embodiment of the present invention. The light source module 500 includes the first light source 110A, the second light source 110b, a third light source 410C, a fourth light source 410D, a fifth light source 410E, a first light-splitting element 420A, a second light-splitting element 420B, a third light-splitting element 420C, and at least one condensing lens (for example, the first condensing lens 130A, the second condensing lens 130b, the third condensing lens 130C, the fourth condensing lens 130D, the fifth condensing lens 330E), the first reflective element 240A, and the second reflective element 240B.

The light source module 500 of the embodiment of the present invention has the features similar to or the same as that of the light source module 400 except that the light source module 500 further includes the first reflective element 240A and the second reflective element 240B. The arrangement and/or functions of the first reflective element 240A and the second reflective element 240B are similar to or the same as that of the first reflective element 240A and the second reflective element 240B of the light source module 200, and the similarities will not be repeated here.

As shown in FIG. 5, the seventh part L51 of the fifth light L5 is incident to the first light source 110A through the third light-splitting element 420C and the first light-splitting element 420A. The seventh part L51 is converted into the converted light L51a having the first wavelength by the first wavelength conversion layer 110A3 of the first light source 110A and reflected to the first condensing lens 130A through the first reflective layer 110A1. The optical path of the converted light L51a reflected from the first light source 110A is similar to or the same as the optical path of the first part L11 and the second part L12 of FIG. 3, and the similarities will not be repeated here. Similarly, the eighth part L52 of the fifth light L5 is incident to the second light source 110б through the third light-splitting element 420C and the second light-splitting element 420B. The eighth part L52 is converted into the converted light L52a having the first wavelength by the second wavelength conversion layer 110B3 of the second light source 110B, and reflected to the second condensing lens 130B through the second reflective layer 110B1. The optical path of the converted light L52a reflected from the second light source 110B is similar to or the same as the optical path of the third part L21 and the fourth part L22 of FIG. 3, and the similarities will not be repeated here.

Figure 6:
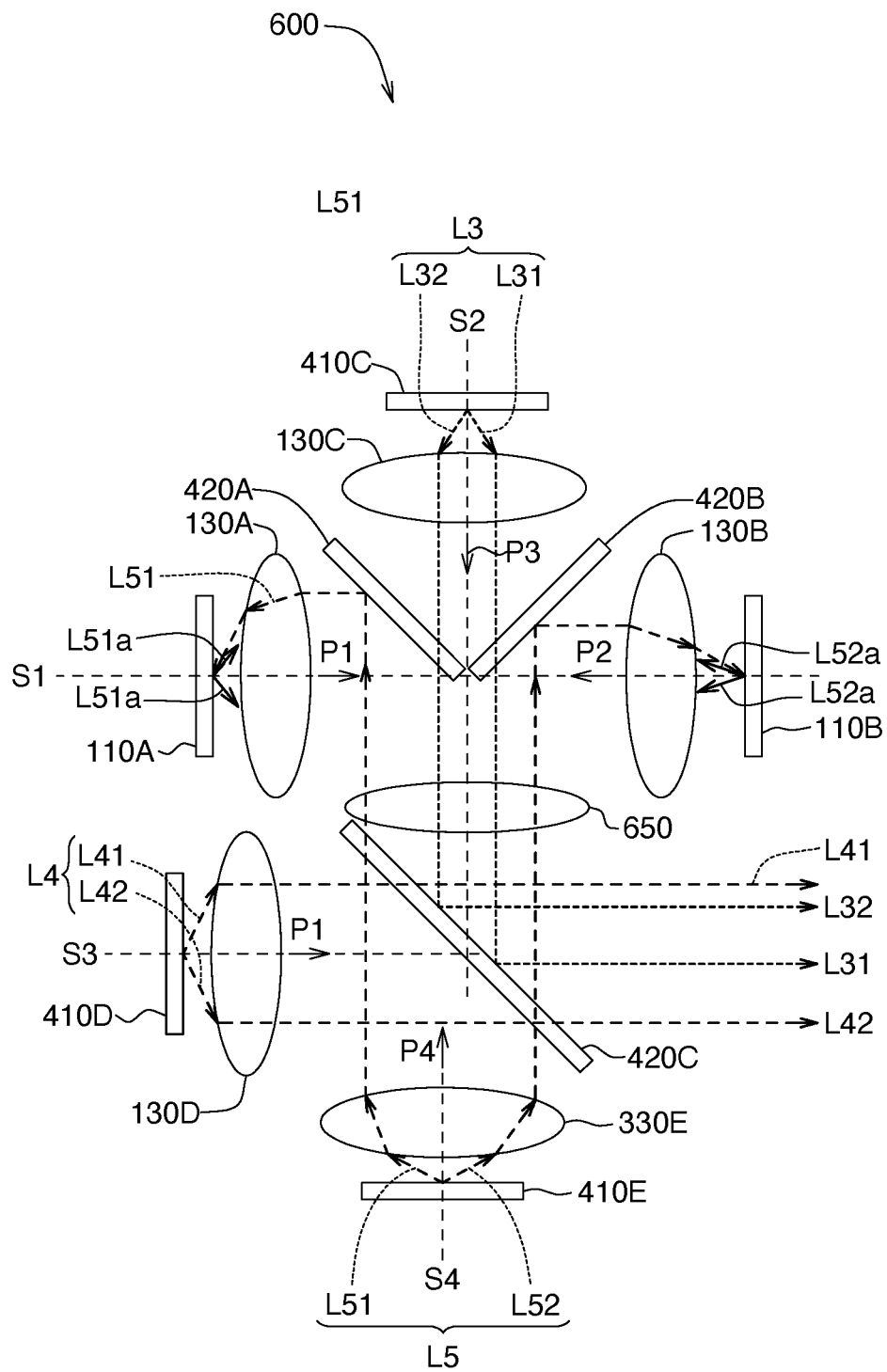
FIG. 6 shows a schematic diagram of the optical path of a light source module according to another embodiment of the present invention.

Referring to FIG. 6, FIG. 6 shows a schematic diagram of the optical path of a light source module 600 according to another embodiment of the present invention. The light source module 600 includes the first light source 110A, the second light source 110б, the third light source 410C, the fourth light source 110D, the fifth light source 410E, the first light-splitting element 420A, the second light-splitting element 420B, the third light-splitting element 420C, at least one condensing lens (for example, the first condensing lens 130A, the second condensing lens 130B, the third condensing lens 130C, the fourth condensing lens 130D, the fifth condensing lens 330E) and a relay lens 650.

The light source module 600 has the technical features same as or similar to that of the aforementioned light source module 400 except that the light source module 600 further includes the relay lens 650. The relay lens 650 could make the modules that travel a longer path also get better lighting efficiency.

In summary, the embodiment of the present disclosure provides a light source module including at least one light-splitting element and two light sources, wherein the two light sources are oppositely disposed and/or their optical axes are substantially parallel. At least one light-splitting element is disposed between the two light sources, so that the optical path length of light emitted by the two light sources could be shortened. Due to two light sources having the same wavelength and oppositely disposed, it could increase the brightness of the light source module. In addition, the light source herein is, for example, a light source that could actively emit light (including the semiconductor epitaxial layer), such as a light-emitting diode or a laser light source, but it could also be a light source that converts the wavelength of an external light and reflects it to be emitted (for example, without the light-emitting layer).

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A light source module, comprises:
   a first light-splitting element;
   a second light-splitting element;
   a first light source configured to emit a first light having a first wavelength to the first light-splitting element in a first optical path direction;
   a second light source configured to emit a second light having the first wavelength to the second light-splitting element in a second optical path direction opposite to the second optical path direction;
   a third light source configured to emit a third light having a second wavelength to travel in a third optical path direction, wherein the third optical path direction is substantially perpendicular to the first optical path direction, and the second wavelength is different from the first wavelength;
   wherein the first light source comprises a first reflective layer, the second light source comprises a second reflective layer, and the first reflective layer and the second reflective layer are configured to reflect light having the first wavelength.

2. The light source module according to claim 1, wherein the first light source and the second light source are disposed in a center line, and the third light source, the first light-splitting element and the second light-splitting element are disposed on a side of the center line.

3. The light source module according to claim 2, wherein the center line passes through a center of the first light source and a center of the second light source.

4. The light source module according to claim 1, wherein the third light source is disposed in a center line, and the first light-splitting element and the second light-splitting element are disposed on opposite two sides of the center line respectively.

5. The light source module according to claim 4, further comprising:
   a third light-splitting element configured to reflect the first light having the first wavelength, the second light having the first wavelength and the third light having the second wavelength;
   wherein the center line passes through the third light-splitting element.

6. The light source module according to claim 1, further comprises:
   at least one condensing lens disposed opposite to at least one of the first light source, the second light source and the third light source.

7. The light source module according to claim 1, further comprises:
   a third light-splitting element configured to reflect the first light having the first wavelength, the second light having the first wavelength and the third light having the second wavelength and allow light having a third wavelength to travel through; and
   a fourth light source configured to emit a fourth light having the third wavelength to the third light-splitting element in the first optical path direction or the second optical path direction.

8. The light source module according to claim 7, further comprises:
   a condensing lens disposed opposite to the fourth light source.

9. The light source module according to claim 1, wherein the first light-splitting element and the second light-splitting element are connected to each other;

wherein the third light is incident to the first light-splitting element and the second light-splitting element in the third optical path direction.

10. The light source module according to claim 1, wherein there is an interval between the first light-splitting element and the second light-splitting element, and at least one portion of the third light travels through the interval in the third optical path direction.

11. The light source module of claim 1, wherein the first light comprises a first part and a second part, the first part is incident to the first light-splitting element in the first optical path direction, and the second part is incident to the second light source in the first optical path direction; the second light comprises a third part and a fourth part, the third part is incident to the second light-splitting element in the second optical path direction, and the fourth part is incident to the first light source in the second optical path direction.

12. The light source module according to claim 1, further comprises:
a first reflective element disposed opposite to the first light source; and
a second reflective element disposed opposite to the second light source;
wherein the first light comprises a first part and a second part, the first part is incident to the first light-splitting element in the first optical path direction, and the second part is incident to the first reflective element in the first optical path direction; the second light comprises a third part and a fourth part, the third part is incident to the second light-splitting element in the second optical path direction, and the fourth part is incident to the second reflective element in the second optical path direction.

13. The light source module according to claim 12, wherein the first light source and the second light source are disposed on a center line, and the third light source, the first light-splitting element and the second light-splitting element are disposed on a side of the center line, the first reflective element and the second reflective element are disposed on another opposite side of the center line.

14. The light source module according to claim 13, wherein the first reflective element is located outside an optical path of the first part of the first light; the second reflective element is located outside an optical path of the third part of the second light.

15. The light source module according to claim 7, further comprises:
a third reflective element disposed opposite to the fourth light source;
wherein the fourth light comprises a fifth part and a sixth part, the fifth part is incident to the third light-splitting element in the first optical path direction, and the sixth part is incident to the third reflective element in the first optical path direction.

16. The light source module according to claim 7, further comprises:
a fourth reflective element;
a fifth reflective element; and
a fifth light source configured to emit a fifth light having the third wavelength to travel in a fourth optical path direction, wherein the fifth light comprises a seventh part and an eighth part, the seventh part is incident to the fourth reflective element in the fourth optical path, and the eighth part is incident to the fifth reflective element in the fourth optical path direction.

17. The light source module according to claim 16, wherein the fifth light source is disposed in a center line, and the fourth reflective element and the fifth reflective element are disposed on opposite two sides of the center line respectively.

18. The light source module according to claim 15, wherein the fourth light source is disposed in a center line, and the third reflective element is disposed on a side of the center line.

19. The light source module according to claim 7, further comprises:
a fifth light source configured to emit a fifth light having the third wavelength incident to the first light-splitting element and the second light-splitting element in a fourth optical path direction, wherein the fourth optical path direction is opposite to the third optical path direction;
wherein the first light source further comprises a first wavelength conversion layer, the second light source further comprises a second wavelength conversion layer, and the first wavelength conversion layer and the second wavelength conversion layer are configured to convert the fifth light having the third wavelength into light having the first wavelength.

20. The light source module described in claim 19, further comprises:
a first reflective element disposed opposite to the first light source; and
a second reflective element disposed opposite to the second light source;
wherein the first light comprises a first part and a second part, the first part is incident to the first light-splitting element in the first optical path direction, and the second part is incident to the first reflective element in the first optical path direction; the second light comprises a third part and a fourth part, the third part is incident to the second light-splitting element in the second optical path direction, and the fourth part is incident to the second reflection in the second optical path direction.

* * * * *